United States Patent
Womersley (10) Patent No.: US 8,706,380 B2
(45) Date of Patent: Apr. 22, 2014

(54) METHOD OF OPERATING A COMPRESSION IGNITION ENGINE

(75) Inventor: Robert Womersley, Stoke on Trent (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 787 days.

(21) Appl. No.: 12/727,411

(22) Filed: Mar. 19, 2010

(65) Prior Publication Data

US 2010/0242913 A1 Sep. 30, 2010

(30) Foreign Application Priority Data

Mar. 25, 2009 (GB) .................................. 0905049.3

(51) Int. Cl.
*B60T 7/12* (2006.01)
*G06D 1/00* (2006.01)
*G06F 7/00* (2006.01)
*G06F 17/00* (2006.01)
*F02M 7/00* (2006.01)

(52) U.S. Cl.
USPC .......................................... 701/103; 123/435

(58) Field of Classification Search
USPC .......... 123/435, 305, 179.16–179.17, 406.21, 123/406.22, 406.17, 406.37, 406.41, 123/406.42, 406.43, 406.53, 406.55; 701/103, 105, 113
See application file for complete search history.

(56) References Cited

U.S. PATENT DOCUMENTS

| | | | | |
|---|---|---|---|---|
| 4,962,739 A | * | 10/1990 | Wataya | 123/435 |
| 5,542,395 A | * | 8/1996 | Tuckey et al. | 123/497 |
| 6,092,016 A | * | 7/2000 | Sarangapani et al. | 701/102 |
| 6,708,661 B1 | * | 3/2004 | Aubourg et al. | 123/179.16 |
| 6,793,456 B2 | * | 9/2004 | Kotani et al. | 415/1 |
| 7,096,860 B2 | * | 8/2006 | Reuss | 123/563 |
| 7,150,262 B2 | * | 12/2006 | Demura et al. | 123/305 |

FOREIGN PATENT DOCUMENTS

| | | |
|---|---|---|
| DE | 3334617 | 4/1985 |
| EP | 1203875 | 5/2002 |
| EP | 1645739 | 4/2006 |
| JP | 56006030 | 1/1981 |
| WO | WO 2006/104798 | 10/2006 |

* cited by examiner

*Primary Examiner* — Stephen K Cronin
*Assistant Examiner* — Sherman Manley
(74) *Attorney, Agent, or Firm* — Lathrop & Gage LLP (57) ABSTRACT

A method of operating a compression ignition engine, which includes at least one combustion chamber containing a piston, and a mechanically operated fuel injection pump apparatus. The method includes sensing the engine operating temperature with a first sensor, and providing input to a controller. The controller operates the fuel injection pump apparatus to deliver fuel to each of the combustion chambers according to a first timing regime when the engine operating temperature is above a threshold temperature, and according to a second, advanced timing, regime when the engine operating temperature is below the threshold temperature. The method further includes sensing the pressure in the combustion chambers with a second sensor. When the controller is operating the fuel injection pump apparatus according to the second timing regime and the combustion chamber pressure exceeds a desired pressure, the method includes changing operation from the second timing regime to the first timing regime.

12 Claims, 3 Drawing Sheets

METHOD OF OPERATING A COMPRESSION IGNITION ENGINE

CROSS-REFERENCE TO RELATED APPLICATIONS

This application claims priority under 35 USC 119(a)-(d) to United Kingdom Patent Application No. GB 0905049.3 filed on Mar. 25, 2009, which is incorporated by reference in its entirety herein.

BACKGROUND TO THE INVENTION

This invention relates to a method of operating a compression ignition engine such as a diesel engine, and more particularly to a method of operating a compression ignition engine in which fuel is delivered to the or each combustion chamber of the engine by a mechanically operated fuel injection pump apparatus.

A mechanically operated fuel injection pump apparatus is typically driven by the engine, e.g. by the engine crankshaft, and includes one or more pumping chambers from which fuel is distributed for feeding directly into the or each combustion chamber by a or a respective injector, or indirectly, into a or a respective charge air airway or manifold, by an injector so that the fuel is mixed with the air in the combustion chamber or chambers. Fuel typically is injected into the or each combustion chambers directly or indirectly, prior to the piston in the combustion chamber reaching top dead centre (TDC), and typically the fuel will be ignited prior to the TDC piston position. Fuel may continue to be delivered to the combustion chamber as the piston moves away from TDC.

The fuel injector pump apparatus is operated to deliver to the or each combustion chamber a metered volume of fuel in accordance with demand set by an engine governor, and according to a timing regime i.e. at a selected crank angle before TDC when fuel injection commences and after TDC when fuel injection ceases, which volume of fuel and timing regime is generally arranged to ensure maximum fuel combustion and engine economy, and minimum emissions.

It is known that in normal use of the engine, when the engine operating temperature is raised to a normal operating temperature, a different fuel injection timing regime is desirable compared to when the engine is cold, i.e. on start up. Accordingly it is known to operate the fuel injection pump apparatus according to a different, advanced timing, regime during engine start up, to ensure fuel is provided in the or each combustion chamber earlier in the combustion cycle, i.e. earlier before combustion is initiated in the combustion chamber, which is earlier before the piston reaches TDC that is, at an advanced crank angle than would normally be the case.

In one kind of fuel injector pump apparatus, the timing regime is changed to a cold starting timing regime by operation of a solenoid by an engine controller, which controller responds to a sensed temperature, being the engine operating temperature or a temperature indicative of the engine operations temperature, when below a threshold temperature.

The solenoid may move a timing component of the fuel injection pump apparatus which advances the onset of fuel injection in each combustion cycle until the engine operating temperature reaches the threshold temperature, when the solenoid is de-energised and the timing component of the fuel injection pump apparatus moves back to a normal operating position so that the onset of fuel injection returns to a normal non-advanced regime.

It will be appreciated that when the fuel injection timing regime is advanced in response to the engine controller, when the engine operating temperature is below the threshold temperature, because fuel will have been provided in the combustion chamber earlier, when combustion commences in each combustion chamber cycle, there will be a surge in pressure in the combustion chamber.

As the torque developed by the engine increases, e.g. engine load increases, the maximum combustion chamber pressure in each operating cycle will commensurately increase.

For a particular engine which may have been designed according to certain engine parameters and/or operated according to design parameters, the design will have a maximum working combustion chamber design pressure which may be greater than any anticipated surge pressure experienced in the or a combustion chamber as a result of operating the engine according to an advanced timing regime.

However, commonly, basic engine designs are modified or their operation is modified, to permit the same basic engine design (i.e. using the same conversion hardware, i.e. engine i.e. the piston(s), rod(s), bearings, head gasket etc.) to be used for alternative applications. For example an engine may be modified or the engine's operation may be modified, in such a way that the maximum combustion chamber pressure is increased, closer towards the maximum design pressure. In such case, any surge in pressure as a result of the fuel injection timing being advanced, could result in maximum pressures in the or a combustion chamber which are not optimal for the engine design.

Moreover, such excess pressure will act on the conversion hardware of the engine (which may not be modified for the modified engine design or operation), and at least as the engine torque develops, the excess pressure could result in damage to or at least prematurely wear the conversion hardware of the engine.

SUMMARY OF THE INVENTION

According to a first aspect of the invention we provide a method of operating a compression ignition engine. The engine may include at least one combustion chamber containing a piston, to which combustion chamber is delivered fuel by a mechanically operated fuel injection pump apparatus, and the method may include sensing the engine operating temperature or a temperature indicative of the engine operating temperature with a first sensor, and providing an input to a controller. The controller may operate the fuel injection pump apparatus to deliver fuel to the or each of the combustion chambers according to a first timing regime when the engine operating temperature is above a threshold temperature, and according to a second, advanced timing, regime when the engine operating temperature is below the threshold temperature. The method may further include sensing with a second sensor the pressure in the or at least one of the combustion chambers or a parameter which is indicative of the pressure in the or each of the combustion chambers, and when the controller is operating the fuel injection pump apparatus according to the second timing regime and the sensed pressure or parameter exceeds a threshold which indicates a combustion chamber pressure above a desired pressure, changing operation of the fuel injection pump apparatus from the second to the first timing regime.

Thus by virtue of the invention, the likelihood of a surge in pressure in the or each combustion chamber during start-up of the engine leading to engine damage, e.g. of conversion components, is alleviated, as a first, normal, timing regime will be employed when too high a pressure is indicated in the engine, notwithstanding that the engine temperature may be below the threshold temperature.

Engine controllers are known which respond to several different sensors to control combustion to ensure the engine operates normally with maximum efficiency and lowest emissions, including temperature and pressure sensors. However the method of the present invention ensures that the pressure in the or each combustion chambers is controlled during start-up as the engine warms, to be lower than that which could damage the engine, i.e. a desirable pressure, by changing from the second, advanced timing, regime to the first, normal, timing regime in anticipation.

Although the pressure actually in the or one of the combustion chambers may be sensed, directly, practically in a production engine this adds unwarranted complexity and cost. Desirably, a pressure is sensed which is indicative of the pressure in the combustion chamber or each of the combustion chambers, e.g. a pressure which is dependent upon the maximum pressure being experienced in a or the or each of the combustion chambers.

In one example, the engine is turbocharged, with the exhaust gases acting on a turbine which drives a compressor to pressurise charge air which is introduced into the or each combustion chamber for combustion. The second sensor may sense the pressure of the exhaust gases, for example in an exhaust gas manifold, or preferably the pressure of the pressurised air. For example, the pressurised charge air may pass through a charge cooler to cool the pressurised charge air prior to the charge air being introduced into the or a combustion chamber, and the second sensor may sense the pressure of the charge air between the compressor and the charge air cooler, which will vary depending upon the pressure in the combustion chamber or chambers.

The fuel injection pump apparatus may include an actuator, such as a solenoid, which responds to a control signal from the controller, to move a timing component of the fuel injection pump apparatus to a position where the onset of fuel injection in each combustion cycle is advanced, usually until the engine operating temperature reaches the threshold temperature, or in accordance with the invention, until the threshold pressure or other parameter is sensed by the second, pressure sensor, upon which the solenoid or other actuator is de-energised, or otherwise moves the timing component or permits the timing component to move back, to a normal position so that the onset of fuel injection returns to a normal non-advanced, first, timing regime.

Because of the inherent layout of mechanical fuel injection pumps apparatus, that is rotary mechanical fuel injection pump apparatus, injection timing may advance naturally with increasing load. Hence whereas there is a high propensity of cold misfire in light load conditions (hence the reason for advancing the timing at low temperatures) this is a substantially reduced risk at higher loads. Thus the timing regime can safely be changed from the second, advanced timing, regime to the first timing regime at higher loads. The method may include changing operation of the fuel injection pump apparatus from the second to the first timing regime when the sensed pressure or other parameter indicates that the pressure in the combustion chamber or chambers is significantly lower than the maximum design pressure of the engine at which damage to the engine may occur.

The sensor for sensing engine operating temperature or a temperature indicative of the engine operating temperature may sense at least one of coolant temperature, lubricant temperature and engine block temperature.

The invention has particular applicability where the engine is used to drive a generator, when the engine will normally be operated at a generally constant load (speed). Thus the engine may be of the fixed speed-governor kind. Advancing the timing upon cold starting facilitates start-up as the torque developed by the engine increases towards a design working torque.

According to a second aspect of the invention we provide an apparatus including an electrical generator and an engine to drive the generator. The engine may include at least one combustion chamber containing a piston, to which combustion chamber is delivered fuel by a mechanically operated fuel injection pump apparatus. There may be a first sensor to sense the engine operating temperature or a temperature indicative of the engine operating temperature and to provide an input to a controller. The fuel injection pump apparatus may be operable by the controller to deliver fuel to the or each of the combustion chambers according to a first timing regime when the engine operating temperature is above a threshold temperature, and according to a second, advanced timing, regime when the engine operating temperature is below the threshold temperature. There may be a second sensor to sense the pressure in the or at least one of the combustion chambers or a parameter which is indicative of the pressure in the or each of the combustion chambers. The controller, when operating the fuel injection pump apparatus according to the second advanced timing, regime, upon the second sensor sensing a threshold pressure or other parameter threshold, which indicates a pressure in the or each of the combustion chambers above a desired pressure, may be operated to change operation of the fuel injection pump apparatus from the second to the first timing regime.

BRIEF DESCRIPTION OF THE DRAWINGS

Embodiments of the invention will now be described with reference to the accompanying drawings.

DETAILED DESCRIPTION

Figure 1:
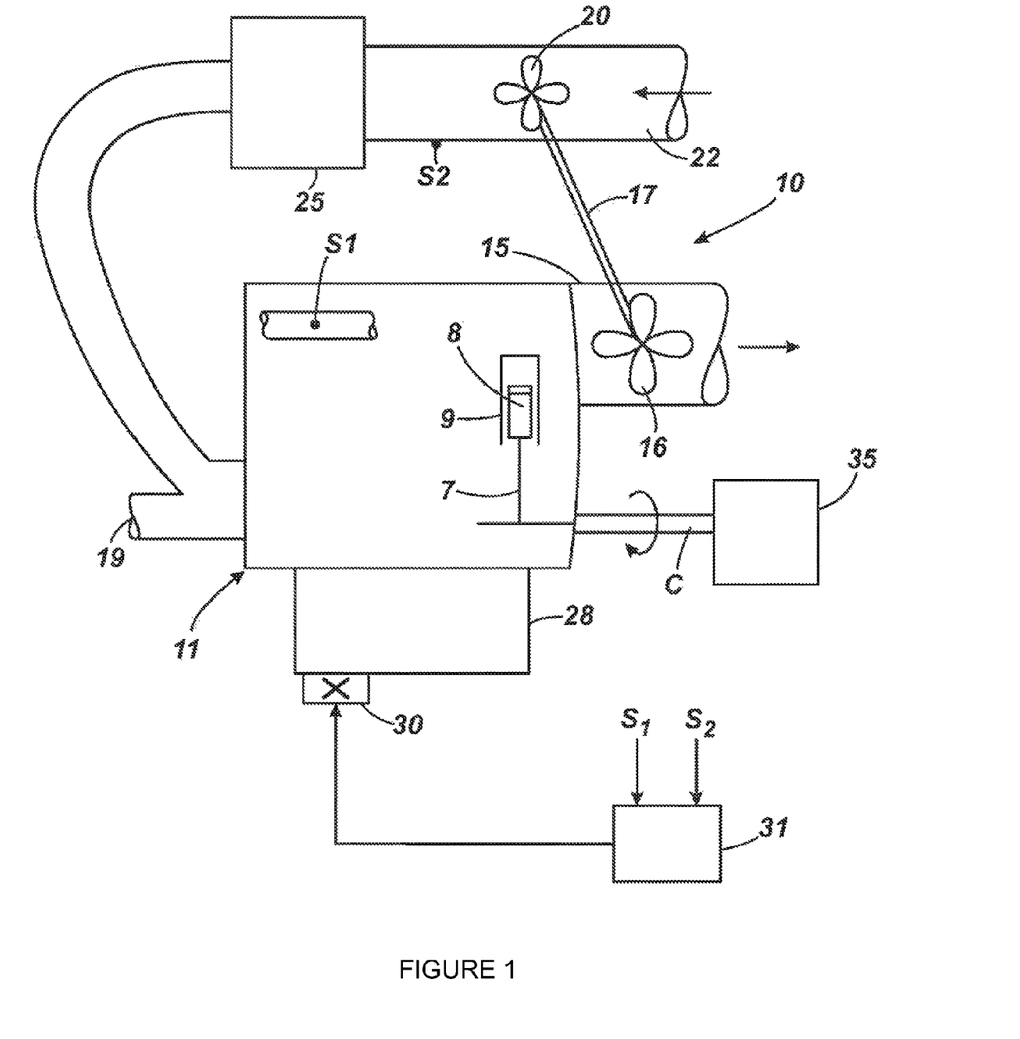
FIG. 1 is a diagrammatic view of an engine which is operated by a method of the invention.

Referring to FIG. 1 a compression ignition engine 10 includes an engine block assembly 11 including a crank case (not shown) which houses a crankshaft C, a plurality of combustion chambers (four in the example—one of which is shown diagrammatically at 9) which each have a piston (one of which is shown at 8) reciprocal therein, the pistons 8 being connected to crankshaft C via connecting rods 7.

In use, fuel is injected either directly into each combustion chamber, or indirectly into a respective charge air airstream leading to the or a respective combustion chamber.

The engine 10 in the example is turbocharged, i.e. exhaust gases fed to a manifold 15 act on a turbine 16 to turn the turbine 16, and hence a shaft 17 on which the turbine 16 is provided, before the exhausted gases are exhausted. Some of the exhaust gases may be fed back to an air intake 19 for introduction back into the combustion chambers with charge air.

Mounted on the shaft 17 is a compressor 20 which is turned as the exhaust gases turn the turbine 16. The compressor 20 compresses ambient air from an air inlet 22 to pressurise the air which is then provided to the air intake 19 for providing as pressurised charge air for combustion in the combustion chambers of the engine 10 together with the fuel.

In the example indicated, the pressurised air from the compressor 20, prior to providing the air to the air intake 19, is cooled in a charge cooler 25.

Fuel for injecting into the combustion chambers of the engine 10 is pressurised by a mechanically driven fuel injection pump apparatus 28 which is shown attached to the engine 10 block assembly 11. The fuel injection pump apparatus 28 is driven from the crankshaft of the engine 10 and in the example is of the rotary kind which delivers a metered volume of fuel (the volume depending upon the setting of an engine 10 governor) towards each of the combustion chambers of the engine 10, and the metered volume of fuel is then injected into the combustion chambers at an appropriate time, for combustion with the charge air.

Figure 2:
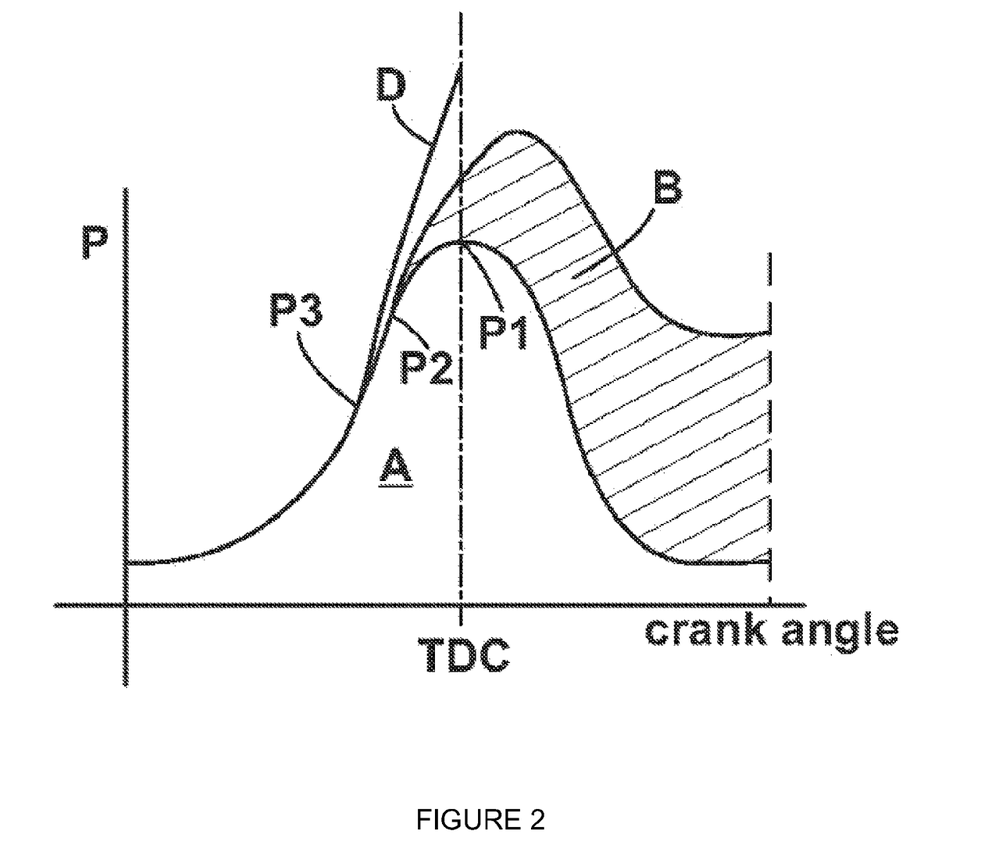
FIG. 2 is a graph illustrating varying pressure in a combustion chamber as the engine crank turns.

Referring also to FIG. 2, as the crankshaft C of the engine 10 rotates, the piston in each combustion chamber will reciprocate. FIG. 2 illustrates the changing pressure P in one of the combustion chambers. The top-dead-centre or "TDC" position of the piston is indicated. It can be seen that as the piston approaches TDC, in the region indicated at A, in the absence of fuel combustion, the pressure in the combustion chamber will build to a maximum pressure P1, and then as the piston moves away from TDC as the crankshaft continues to rotate, the pressure will ebb. FIG. 2 illustrates that in normal use, when the engine 10 is warm and operating for example in a steady state, fuel is injected into the combustion chamber at the position indicated at P2, several degrees of crankshaft rotation before the piston reaches TDC. At this point P2 the temperature of the charge air compressed by the piston in the combustion chamber may already be above the flashpoint of the fuel, so that the fuel immediately commences combustion.

Fuel continues to be injected (and combust) until after the piston passes TDC, prior to the exhaust past valve of the combustion chamber opening.

The area indicated at B indicates the extra pressure (energy) in the combustion chamber due to the combustion of the fuel.

Upon start up of the engine 10 when the engine 10 is cold i.e. below its normal operating temperature, it is desirable to commence injection of the fuel earlier in the combustion cycle, for example at the position indicted at P3. This lessens the possibility of misfiring as the engine 10 warms. The risk of misfiring decreases as engine 10 load increases as will be explained in more detail below.

To commence injection of the fuel to each of the combustion chambers respectively earlier than point P2 in each combustion chamber operating cycle, a timing component of the fuel injection pump apparatus 28 e.g. a timing ring, is moved by an actuator, which is indicated at 30 in FIG. 1 and is typically a solenoid 30. The solenoid 30 or other actuator is controlled by an engine controller 31 to move the timing component to advance the timing i.e. to bring forward the point at which is fuel injected to the respective combustion chamber, to point P3, when the engine 10 temperature is cold.

In FIG. 1 a first temperature, sensor is shown illustratively at S1. Typically this will sense the temperature of an engine 10 (liquid) coolant, e.g. in a pipe as shown, but may sense lubricating oil temperature, or the temperature of the engine block assembly 11 itself. In each case the first sensor S1 will sense the engine operating temperature or at least a temperature indicative of the engine operating temperature and provides an input to the controller 31. In any event the controller 31 will determine from the input from the first sensor S1 the engine operating temperature. When it is determined that the operating temperature of the engine has reached a threshold temperature, being or corresponding to an engine temperature of say, 55° C., the controller 31 controls the solenoid 30 to move the timing component back, or to allow the timing component to move back, to a position in which fuel is injected according to a normal timing regime, i.e. at point P2 for each combustion chamber operating cycle.

For example, the timing component which is moved by the solenoid 30 to advance the timing, may be spring biased to its normal timing regime position. The controller 31 may signal the solenoid 30 to move the timing component against the spring bias to advance the timing by providing an "on" signal, and the controller 31 may signal the solenoid 30 to allow the timing component to move back to its normal timing regime position by ceasing to provide the "on" signal.

In each case, in normal operation of the fuel injection pump apparatus 28, when the engine 10 operating temperature is determined to be sufficient, i.e. the sensed temperature indicates that the operating temperature is near the threshold temperature, e.g. the normal operating temperature of the engine 10, the fuel injection pump apparatus 28 operates according to a first, normal timing regime, and when advanced fuel injection is required, at lower engine 10 operating temperatures, the fuel injection pump apparatus 28 operates according to a second, advanced timing, regime.

Referring again to FIG. 2, it can be appreciated that when fuel injection timing is advanced, because more fuel is present in the combustion chamber as the piston approaches TDC, there is likely to be a surge of pressure P in the combustion chamber, as suggested at D, as TDC is approached, as the extra fuel ignites, and earlier than normal.

Figure 3:
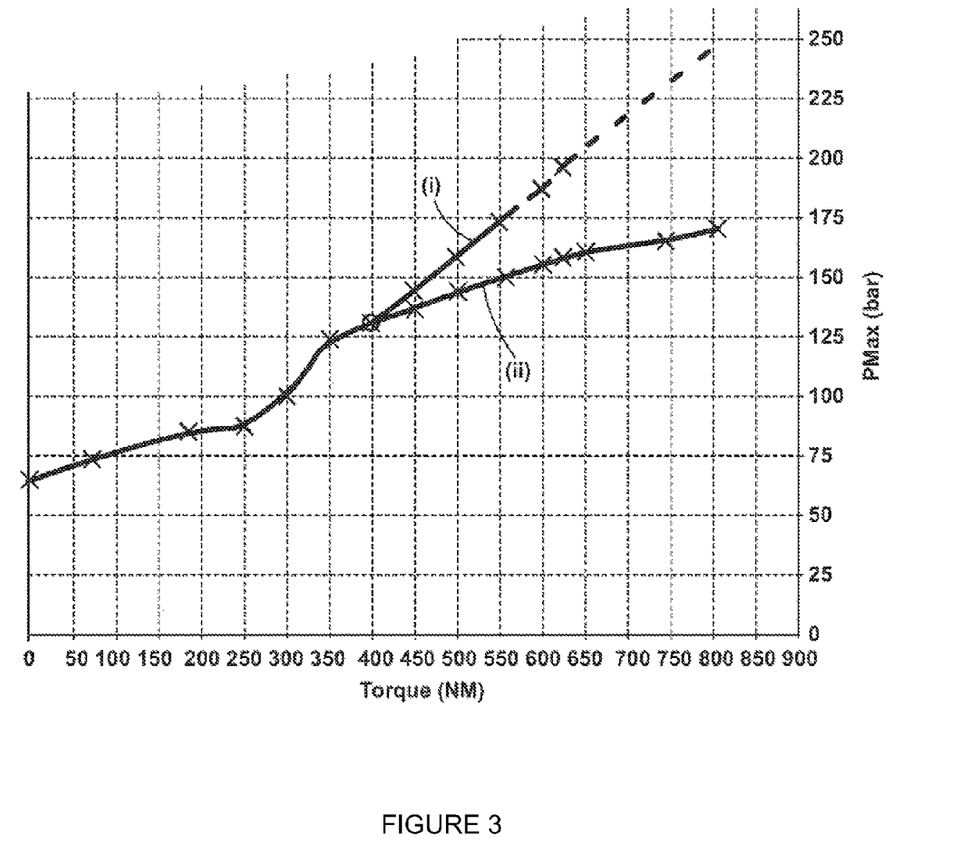
FIG. 3 is a graph plotting increasing engine load (developed torque) against the maximum pressure in the combustion chamber or chambers of the engine of FIG. 1 at constant engine speed, both where the invention is employed, and if the invention is not employed, as the engine warms up.

Referring to the graph of FIG. 3, the maximum pressure PMax in the combustion chamber as the engine 10 load increases, is plotted along the "y" axis for a typical engine 10. The engine 10 load is indicated along the "x" axis in terms of the torque developed by the engine 10, as loads are imposed.

The full line (ii) indicates that PMax increases with increasing engine load, as the engne warms up.

In this example, up to a load of about 400 Nm, PMax will increase steadily.

Where the invention is not employed, it can be seen that where the injection timing is advanced to the second regime, the pressure PMax will surge, as indicated by the dotted line (i). The design pressure rating of the engine 10 may for example, be around 200 bar, and it can be seen that this pressure could be exceeded above loads of about 625 Nm.

This can occur where an existing engine 10 which is able to operate so that the maximum combustion chamber pressure PMax does not exceed the design maximum even when operated at high load in accordance with an advanced timing regime, is modified, or its operation is modified, e.g. to provide additional power in normal (non-advanced timing, regime) operation.

However by employing the invention, in the example when the PMax is in the order of 130 bar, the timing regime will revert to a normal, non-advanced, timing regime, in which use the PMax will, as engine load continues to increase, follow the full line (ii) and PMax will as a result, not rise above about 170 bar in the example, i.e. PMax will remain well below the 200 bar design maximum pressure.

The problem of the maximum combustion chamber pressure PMax possibly exceeding the design maximum (of 200 bar in the example) is particularly but not exclusively highlighted where the engine 10 is to be used for example for driving an electrical generator 35. An engine 10 used to drive a generator 35 is generally operated at a constant speed condition, and is of the fixed governor kind. The engine 10 speed, upon start up, rapidly increases to the operating speed, say 1500 rpm, and high operating load may ensue. As explained above, if the operating torque of the engine 10 driving the generator 35 is above 400 Nm in this example, with the engine being operated according to an advanced timing regime, there is a real risk that the maximum combustion chamber pressure PMax could exceed the design maximum for the engine 10, and this could lead to damage to the conversion hardware of the engine 10.

In accordance with the invention, there is provided a second, pressure, sensor S2. This second sensor S2 in the example is provided to sense the pressure of the pressurised charge air between the compressor 20 and the charge cooler 25. Because the amount of pressurisation of the charge air is dependent upon the operation of the compressor 20, which in turn is dependent upon the operation of the turbine 16, which depends on the engine exhaust gas pressure and hence the pressure in the or each combustion chamber, it will be appreciated that the pressure sensed by the second, pressure, sensor S2 is indicative of, i.e. depends on (according to a complex relationship), the maximum pressure PMax attained in the or each of the combustion chambers.

The second, pressure, sensor S2 provides an input to the controller 31.

In the event that the engine 10 is being operated in accordance with an advanced timing regime as explained above, during a start-up period as the engine 10 warms up, if the signal from the second, pressure, sensor S2 indicates that the maximum combustion chamber pressure PMax may be rising above a desired pressure at which damage to the engine could occur, the controller 31 responds by operating the solenoid 30 or other actuator, to change the timing regime to the first, normal, timing regime, i.e. in which fuel injection timing is not advanced. In this way, the engine 10 is protected from excess combustion chamber pressures, as the maximum combustion chamber pressure PMax will then be limited as indicated by line (ii) in FIG. 3, to well below the maximum design combustion chamber pressure for the engine 10.

It can be seen in FIG. 3 that the controller 31 does not operate to change to a non-advanced timing regime only when the maximum combustion chamber pressure PMax is already surging, but when the maximum combustion chamber pressure PMax is lower than that, corresponding in the example to an engine 10 load (torque) of about 400 Nm. Above this engine 10 load, although misfires due to the engine 10 being cold can occur, these are less likely than at lighter loads and so it is acceptable to change to a non-advanced timing regime well in advance of a risk of a pressure surge.

Thus, the threshold pressure sensed by the second pressure sensor S2 at which the controller 31 changes the timing regime back to the first, normal, non-advanced regime, is arranged to be a threshold pressure indicative of a PMax significantly below the maximum design pressure.

Various modifications are possible without departing from the scope of the invention.

In the embodiment described, the first, temperature, sensor S1 senses the temperature of an engine 10 coolant but could sense another temperature indicative of the engine 10 operating temperature.

The actuator 30 for changing the timing component to and from an advanced timing regime need not be a solenoid 30, but any other preferably, but not essentially, electrically controlled actuator 30. The controller 31 is desirably incorporated into the engine 10 management system and the controller 31 may be responsive to other inputs in addition to the first, temperature, sensor S1, and then the second, pressure, sensor S2, for the purposes of controlling fuel metering to the engine 10 and otherwise controlling the engine 10 for maximum efficiency/lowest emissions.

The invention has specifically been devised to enable an existing engine 10 design to be modified, or its operation to be modified, and used for driving a generator 35 as part of a genset, but the invention has application for other engine 10 uses, especially but not exclusively where the engine 10 is required to run in constant high load conditions, e.g. static engines, or vehicle engines for series hybrid vehicles for examples. The invention may be employed for engines 10 which drive excavating and loading machines, or tractors or the like working machines and vehicles.

The second, pressure, sensor S2 need not be located where suggested, but could otherwise be located. The second, pressure, sensor S2 could sense directly the (or a) combustion chamber pressure, but sensors able to survive such operating conditions tend to be overly expensive and unreliable. The second, pressure, sensor S2 could sense exhaust gas pressure, e.g. in exhaust manifold 15, or the second sensor S2 could even detect turbine speed as an indicator of combustion chamber pressure or another such parameter which is indicative of the pressure in the or each of the combustion chambers of the engine 10.

Where the second, pressure, sensor S2 senses indirectly the combustion chamber pressure, calibration will be required to set the pressure or other parameter sensed at which the controller 31 changes the timing regime to the first, normal, timing regime, corresponding to a desired pressure in the or a combustion chamber which is if desirable not to exceed, to ensure that the controller 31 changes from the second, advanced timing regime to the first, normal, timing regime before there is real risk of a pressure surge which could increase the maximum combustion chamber pressure PMax to above the design maximum for the engine 10.

Although the invention has been described in relation to a turbocharged compression ignition engine 10, e.g. a diesel engine, the invention may be applied to a non-turbocharged compression ignition engine 10, for example an engine 10 where the air charge is unpressurised, or to a supercharged engine 10. In each of these cases, the second, pressure, sensor S2 would require to be provided at an alternative location to that suggested in the example.

An engine to which the invention is applied need not have a plurality of combustion chambers but may have a single combustion chamber, and may be a non-reciprocating internal combustion engine such as a rotary engine.

Having now fully described the present invention in some detail by way of illustration and examples for purposes of clarity of understanding, it will be obvious to one of ordinary skill in the art that the same can be performed by modifying or changing the invention within a wide and equivalent range of conditions and other parameters without resort to undue experimentation without affecting the scope of the invention or any specific embodiment thereof, and that such modifications or changes are intended to be encompassed within the scope of the appended claims. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

All references cited herein are hereby incorporated by reference in their entirety to the extent that there is no inconsistency with the disclosure of this specification. All headings used herein are for convenience only.

The invention claimed is:

1. A method of operating a compression ignition engine which includes at least one combustion chamber containing a piston and a mechanically operated fuel injection pump able to deliver fuel to the at least one combustion chamber, said method comprising the steps of:
   a) operating the mechanically operated fuel injection pump to deliver fuel to the at least one combustion chamber, wherein the fuel is ignited by the temperature of air compressed by the piston in the at least one combustion chamber;
   b) sensing an engine operating temperature or a temperature indicative of the engine operating temperature with a first sensor and generating an input;
   c) providing the input to a controller, wherein said controller operates the mechanically operated fuel injection pump to deliver fuel to the at least one combustion chamber according to:
      i) a first timing regime when the input indicates the compression ignition engine operating temperature is above a threshold temperature, or
      ii) a second timing regime when the input indicates the compression ignition engine operating temperature is below a threshold temperature;
   d) sensing with a second sensor a pressure in the at least one combustion chamber or a parameter indicative of the pressure in the at least one combustion chamber; and
   e) when the controller is operating the mechanically operated fuel injection pump according to the second timing regime, changing operation of the mechanically operated fuel injection pump from the second timing regime to the first timing regime when the sensed pressure or parameter indicative of the pressure exceeds a desired pressure threshold.

2. The method according to claim 1 wherein the second sensor senses a pressure which is indicative of the maximum pressure being experienced in the at least one combustion chamber.

3. The method according to claim 2 wherein the engine is turbocharged, with the exhaust gases acting on a turbine which drives a compressor to pressurise charge air which is introduced into the at least one combustion chamber for combustion, the second sensor sensing one of the pressure of the exhaust gases, and the pressure of the pressurised air.

4. The method according to claim 3 wherein the pressurised charge air is passed through a charge cooler to cool the pressurised charge air prior to the charge air being introduced into the at least one combustion chamber, and the second sensor senses the pressure of the charge air between the compressor and the charge air cooler.

5. The method according to claim 1 wherein the fuel injection pump includes an actuator which responds to a control signal from the controller, to move a timing component of the fuel injection pump to a position where the onset of fuel injection in each combustion cycle is advanced, until either the engine operating temperature reaches the threshold temperature, or until the threshold pressure or parameter indicative of the pressure is sensed by the second sensor when the actuator moves the timing component or permits the timing component to move back to a normal position so that the onset of fuel injection returns to a normal non-advanced, first, timing regime.

6. The method according to claim 1 further comprising changing operation of the fuel injection pump from the second to the first timing regime when the sensed pressure or parameter indicative of the pressure indicates that the pressure in the combustion chamber or chambers is significantly lower than the maximum design pressure of the engine.

7. The method according to claim 1 which includes sensing at least one of coolant temperature, lubricant temperature and engine block temperature to determine the engine operating temperature.

8. The method according to claim 1 which includes using the engine to drive a generator, and operating the engine at a generally constant load.

9. The method according to claim 8 wherein the engine is of the fixed speed-governor kind.

10. An comprising an electrical generator connected to a compression ignition engine able to drive the electrical generator, the compression ignition engine comprising:
   a) at least one combustion chamber containing a piston;
   b) a mechanically operated fuel injection pump able to deliver fuel to the at least one combustion chamber, wherein the fuel is ignited by the temperature of air compressed by the piston in the at least one combustion chamber;
   c) a first sensor able to sense operating temperature of the compression ignition engine or a temperature indicative of the compression ignition engine operating temperature;
   d) a second sensor able to sense pressure in the at least one combustion chamber or a parameter indicative of the pressure in the at least one combustion chamber; and
   e) a controller operationally connected to the mechanically operated fuel injection pump, wherein the controller controls the mechanically operated fuel injection pump apparatus so as to:
      i) deliver fuel to the at least one combustion chamber according to a first timing regime when the sensed compression ignition engine operating temperature is above a threshold temperature to drive the electric generator;
      ii) deliver fuel according to a second advanced timing regime when the sensed compression ignition engine operating temperature is below the threshold temperature to drive the electric generator; and
      iii) when operating the mechanically operated fuel injection pump to deliver fuel to according to the second advanced timing regime, changing operation of the mechanically operated fuel injection pump from the second to the first timing regime to drive the electric generator when the sensed pressure or parameter indicative of the pressure in the at least one combustion chamber exceeds a desired pressure threshold.

11. The method of claim 1, wherein the first timing regime delivers fuel to the at least one combustion chamber when the piston within the combustion chamber is at a first position, and the second timing regime delivers fuel to the at least one combustion chamber when the piston within the combustion chamber is at an earlier position than the first position.

12. The of claim 10, wherein the first timing regime delivers fuel to the at least one combustion chamber when the piston within the combustion chamber is at a first position, and the second timing regime delivers fuel to the at least one combustion chamber when the piston within the combustion chamber is at an earlier position than the first position.

* * * * *

UNITED STATES PATENT AND TRADEMARK OFFICE
CERTIFICATE OF CORRECTION

PATENT NO.        : 8,706,380 B2
APPLICATION NO.   : 12/727411
DATED             : April 22, 2014
INVENTOR(S)       : Robert Womersley

It is certified that error appears in the above-identified patent and that said Letters Patent is hereby corrected as shown below:

In the Claims

In column 10, line 34, Claim 10, please insert the word --apparatus-- between "An" and "comprising".

In column 11, line 10, Claim 12, please insert the word --apparatus-- between "The" and "of".

Signed and Sealed this
Twenty-third Day of September, 2014

Michelle K. Lee
*Deputy Director of the United States Patent and Trademark Office*